(12) United States Patent
Gehring et al.

(10) Patent No.: US 10,839,790 B2
(45) Date of Patent: Nov. 17, 2020

(54) SEQUENCE-TO-SEQUENCE CONVOLUTIONAL ARCHITECTURE

(71) Applicant: Facebook, Inc., Menlo Park, CA (US)

(72) Inventors: Jonas Gehring, San Francisco, CA (US); Michael Auli, Menlo Park, CA (US); Yann Nicolas Dauphin, San Francisco, CA (US); David G. Grangier, Mountain View, CA (US); Dzianis Yarats, Redwood City, CA (US)

(73) Assignee: FACEBOOK, INC., Menlo Park, CA (US)

( * ) Notice: Subject to any disclaimer, the term of this patent is extended or adjusted under 35 U.S.C. 154(b) by 41 days.

(21) Appl. No.: 15/848,199

(22) Filed: Dec. 20, 2017

(65) Prior Publication Data
US 2018/0261214 A1 Sep. 13, 2018

Related U.S. Application Data

(60) Provisional application No. 62/455,354, filed on Feb. 6, 2017.

(51) Int. Cl.
| | |
|---|---|
| *G10L 15/16* | (2006.01) |
| *G06N 3/04* | (2006.01) |
| *G10L 15/22* | (2006.01) |
| *G06N 3/08* | (2006.01) |
| *G06F 40/47* | (2020.01) |

(52) U.S. Cl.
CPC .............. *G10L 15/16* (2013.01); *G06F 40/47* (2020.01); *G06N 3/04* (2013.01); *G06N 3/0454* (2013.01); *G06N 3/08* (2013.01); *G06N 3/082* (2013.01); *G06N 3/084* (2013.01); *G10L 15/22* (2013.01); *G06N 3/0445* (2013.01)

(58) Field of Classification Search
CPC ....................................................... G10L 15/16
See application file for complete search history.

(56) References Cited

U.S. PATENT DOCUMENTS

| | | | | |
|---|---|---|---|---|
| 9,990,918 | B1 * | 6/2018 | Chan | G06N 3/0445 |
| 2016/0099010 | A1 * | 4/2016 | Sainath | G06N 3/0454 |
| | | | | 704/232 |
| 2018/0005082 | A1 * | 1/2018 | Bluche | G06K 9/00409 |
| 2018/0075343 | A1 * | 3/2018 | van den Oord | G10L 13/086 |

* cited by examiner

*Primary Examiner* — Feng-Tzer Tzeng

(57) ABSTRACT

Exemplary embodiments relate to improvements to neural networks for translation and other sequence-to-sequence tasks. A convolutional neural network may include multiple blocks, each having a convolution layer and gated linear units; gating may determine what information passes through to the next block level. Residual connections, which add the input of a block back to its output, may be applied around each block. Further, an attention may be applied to determine which word is most relevant to translate next. By applying repeated passes of the attention to multiple layers of the decoder, the decoder is able to work on the entire structure of a sentence at once (with no temporal dependency). In addition to better accuracy, this configuration is better at capturing long-range dependencies, better models the hierarchical syntax structure of a sentence, and is highly parallelizable and thus faster to run on hardware.

20 Claims, 10 Drawing Sheets

Sequence-to-
Sequence Logic
500

SEQUENCE-TO-SEQUENCE CONVOLUTIONAL ARCHITECTURE

RELATED APPLICATIONS

This application claims priority to U.S. Provisional Application Ser. No. 62/455,354, filed on Feb. 6, 2017 and entitled "a Convolutional Architecture for Sequence to Sequence Learning," the contents of which are hereby incorporated by reference.

BACKGROUND

Artificial neural networks have been applied to sequence-to-sequence tasks, in which an input sequence (of potentially unknown length) is mapped to an output sequence. Examples of sequence-to-sequence tasks include machine translation (translating a sequence of words from a source language into a sequence of words from a destination language), knowledge-base searches (mapping a sequence of words corresponding to a question to a sequence of words corresponding to an answer), speech recognition (mapping a sequence of input audio data to a sequence of text words), conversation bot logic (mapping a sequence of entries in a conversation to a sequence of words corresponding to the next response in the conversation), etc.

Different types of artificial neural networks exist. One type of neural network commonly used in sequence-to-sequence learning is the recurrent neural network, in which connections between units of the network form a repeated cycle. However, because recurrent neural networks must maintain the state of previous events in the cycle, recurrent neural networks cannot be easily parallelized. Thus, a recurrent neural network may run relatively slow when implemented on hardware, due to a lack of parallel processing capabilities.

Furthermore, recurrent neural networks generally take a sequence (e.g., of words) and operate on them in a linear manner (e.g., from left-to-right within a sentence or phrase). However, many sequences have long-range dependencies and are hierarchical (rather than linear) in nature. Accordingly, recurrent neural networks may have some difficulty accurately representing the syntax structure of real-world sequences.

BRIEF DESCRIPTION OF THE DRAWINGS

FIGS. 4A-4E depict examples of heatmaps representing attention scores or various layers of a CNN decoder;

DETAILED DESCRIPTION

Figure 1:
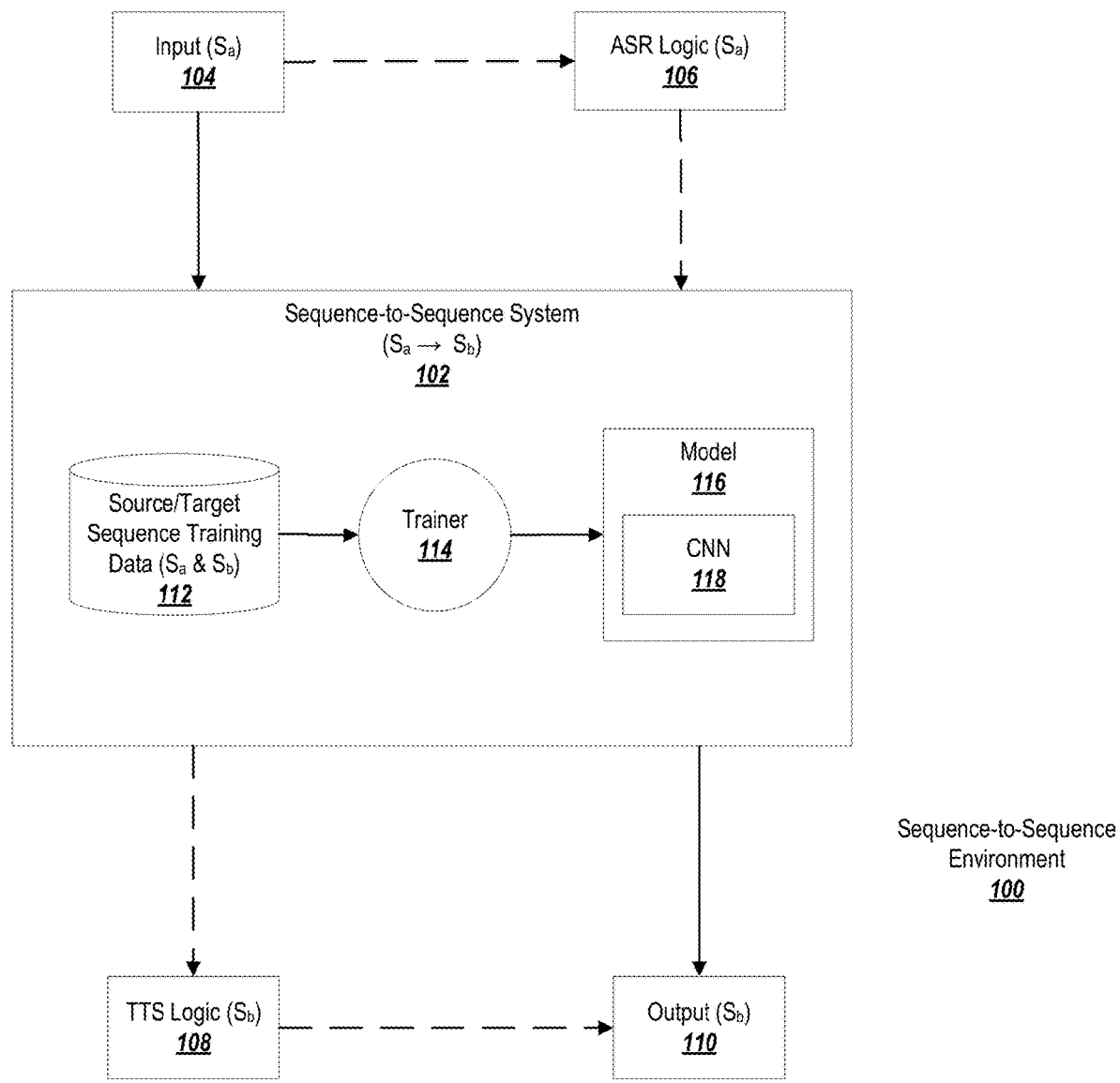
FIG. 1 depicts an example of a sequence-to-sequence learning task.

As noted above, recurrent neural networks suffer from a number of drawbacks when applied to sequence-to-sequence learning. The present application describes an alternative approach involving convolutional neural networks (CNNs) with a particular set of features and improvements.

The exemplary CNN includes multiple blocks (e.g., up to 15), each having a convolution layer and a nonlinearity, such as gated linear units. The gating of each block determines what elements of the block input makes it through to the next block level. Residual connections may be provided around each block, which add the input of the block back to the output. This configuration results in better accuracy in the sequence-to-sequence mapping.

Further, an attention may be applied to determine which input element is most relevant to operate on next (the system works on the word for which the attention is highest). For example, in a CNN applied as a translation system, the attention may determine which of the input words is most relevant to translate next. By applying repeated passes of an attention to multiple layers of the decoder layer of the CNN, the decoder is able to work on the entire structure of a sentence at once (i.e., with no temporal dependency). In addition to the better accuracy noted above, this configuration is better at capturing long-range dependencies, models the syntax structure of a sentence better, and is faster to run on hardware (due to being highly parallelized).

These and other features of exemplary embodiments are described in more detail below. Before further discussing the exemplary embodiments, however, a general note regarding data privacy is provided.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Sequence-to-Sequence Learning System

FIG. 1 depicts an example of a sequence-to-sequence learning task. Sequence-to-sequence system 102 performs a translation from an input sequence $S_a$ to an output sequence $S_b$. The sequences may typically comprise a sequence in a first language translated to a sequence in a second language, but the embodiments are not necessarily limited to that application. The sequence-to-sequence system 102 may also be used, for example, to map a sequence of words corresponding to a question to a sequence of words corresponding to an answer or to map a sequence of input audio data to a sequence of text words.

An input $S_a$ 104 may be provided to the sequence-to-sequence system 102. In the case of a translation task, the input 104 may be in the form of text in a source language, such as text input from a keyboard via a web browser or application. For other types of sequence-to-sequence tasks, other types of input sequences may be used. For instance, if the sequence-to-sequence system maps a question to an answer, the input may include the text of the question and, optionally, a knowledge base in which the answer may be found. For a speech recognition system, the input may include an audio recording.

The input 104 may also take other forms, writing provided directly to a computing system through a stylus or electronic pen, writing indirectly provided to a computing system (e.g., by scanning a handwritten or typed document), a photograph (e.g., a photograph of a sign), and other suitable types of input. To provide the input 104, a user may interact with the system via a graphical user interface displayed on a computing device screen (or active touch screen), a pointing device such as a mouse or pen, a microphone, and/or a keyboard.

Accordingly, to handle multiple different types of inputs 104, logic may be provided for converting the input 104 into text. For example, FIG. 1 depicts automatic speech recognition (ASR) logic 106 that is configured to convert input audio in the source language into text in the source language. To convert an audio recording to text, the ASR logic 106 may utilize an acoustic model, an ASR class-based language model, and a recognition lexicon model. One example of suitable ASR logic is the "Ninja" speech recognizer system developed at Mobile Technologies, LLC. Other types of ASR logic that may be used include speech recognizers developed by IBM Corporation, SRI, BBN. Cambridge, or Aachen.

Other types of logic may be provided for other types of inputs 104 (e.g., optical character recognition logic for converting input handwriting or typing, image analysis logic for converting input photographs, etc.). If the sequence-to-sequence system 102 operates on something other than text (e.g., audio), suitable logic may be provided for converting the input 104 into a format recognizable by system 102.

Generally, the sequence-to-sequence system 102 applies a model 116 to a source sequence $S_a$ in the input 104 to develop an output sequence $S_b$. The model 116 may include, for example, convolutional neural network 118, as described below, which has been trained using trainer 114 with source/target sequence training data 112. In the case of a translation system, the source/target sequence training data 112 may comprise, for example, an ordered set of sentence or phrase pairs (each sentence of phrase representing a sequence), with the first sentence/phrase in the pair being the source sequence in the source language and the second sentence/phrase being the target sequence in the target language. For example, exemplary source/target training data sets 112 may include a set of sentences in English paired with equivalent sentences in French, German, or any other language. In other types of tasks, the first sequence in the pair may represent an input to the system (e.g., a question and a knowledge base, an audio recording for speech recognition, etc.), and the second sequence in the pair may be the desired output to be generated based on the first sequence (e.g., an answer to the question, a textual transformation of the audio recording, etc.).

After applying the model 118 to the input sequence $S_a$ 104, the sequence-to-sequence system 102 may generate an output sequence $S_b$ 110. The output sequence 110 may be in textual format and may be presented on a display device. If it is desirable to provide the output sequence 110 in a format other than text, then logic may be employed for converting the output sequence 110 into the desired format. For example, FIG. 1 depicts text-to-speech (TTS) logic 108 for converting the text generated by the sequence-to-sequence system 102 into an audio recording. The TTS logic 108 generates audio output for an output device, such as a speaker. Examples of suitable TTS logic 108 include the Cepstral TTS module was used. Other TTS modules, such as TTS modules which support Windows SAPI (speech application programming interface) conventions, could also be employed.

Figure 2:
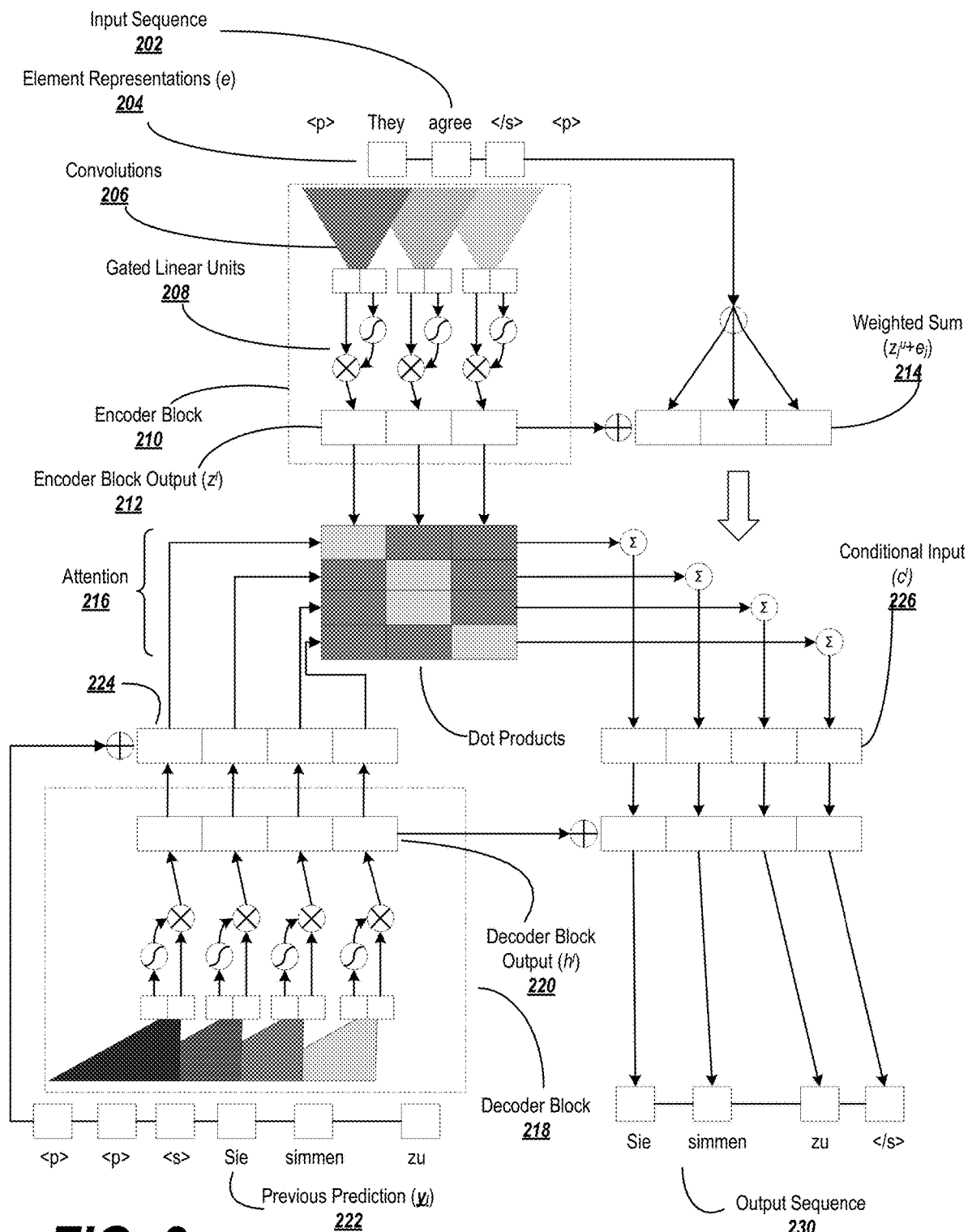
FIG. 2 depicts an example of a convolutional neural network suitable for use with exemplary embodiments.

FIG. 2 depicts an example of a convolutional neural network suitable for use with exemplary embodiments. The embodiments presented herein may use convolutional neural networks 206 to compute an intermediate state z from an encoder 210. A decoder 218 uses the intermediate state z' to generate an output sequence y using a hidden state h', as described below.

Note that because encoder 210 and decoder 218 share similar components, for example, convolution kernels 206 and gated linear units 208, the components in the decoder 218 have not been labeled in FIG. 2. The encoder may represent a network made up of one or more encoder blocks 210; similarly, the decoder may represent a network made up of one or more decoder blocks 218 (the term "layers" and "blocks" are sometimes used interchangeably in the context of CNNs). The encoder blocks 210 and/or decoder blocks 218 may be stacked (e.g., in a depth direction of the network). Due to space constraints, only a single example of an encoder block 210 and a decoder block 218 are shown in FIG. 2; however, it is understood that more blocks may be provided for the encoder network and/or decoder network. Moreover, as discussed below, the number of blocks in the encoder network and the decoder network need not be the same.

Position Embeddings

Input elements $x=(x_1, \ldots, x_m)$ from input sequence 202 are embedded in distributional space 204 as $w=(w_1, \ldots, w_m)$ where $w_j \in \mathbb{R}^f$ is a column in an embedding matrix $\mathcal{D} \in \mathbb{R}^{v \times f}$. The model is provided with a sense of order by embedding the absolute position of input elements $p=(p_1, \ldots, p_m)$ where $p_j \in \mathbb{R}^f$. Both are combined to obtain element representations 204, represented by $e=(w_1+p_1, \ldots, w_m+p_m)$. Position embeddings give the model a sense of which portion of the sequence in the input or output it is currently processing. For output elements that were already generated by the decoder network, a similar process is applied to yield $g=(g_1, \ldots, g_n)$.

Convolutional Block Structure

Both encoder 210 and decoder 218 share a simple block structure that computes intermediate states based on a fixed number of input elements. The output of the l-th block is denoted as $h^l=(h_1^l, \ldots, h_n^l)$ 220 for the decoder network and $z^l=(z_1^l, \ldots, z_m^l)$ for the encoder network. Each block contains a one-dimensional convolution (e.g., the set of convolution kernels 206) followed by a non-linearity (e.g., the set of gated linear units 208). Non-linearities allow the networks to exploit the full input field, or to focus on fewer elements if needed.

For a network with a single block and kernel width k, each resulting state $h_i^l$ contains information of k input elements. Stacking several blocks on top of each other increases the number of input elements that are represented in a state. For instance, stacking 6 blocks with k=5 results in an input field of 25 elements, that is, each output depends on 25 input elements.

The number of blocks 210, 218 in the encoder and decoder can be varied. In some embodiments, deeper architectures may be particularly beneficial for the encoder but less so for the decoder. In one experiment relating to translation tasks, it was discovered that a decoder setup with two blocks 218 performs well, whereas for the encoder accuracy increased steadily with more blocks 210, up to 9 layers, where accuracy started to plateau. Two-layer decoders have a total receptive field of 9 words whereas 9-layer encoders create feature representations for 19 words in total. Large decoder contexts are therefore not necessary to achieve good accuracy, at least in the tested context. Of course, the optimal number of encoder and/or decoder layers may vary by application; for example, it has been found that, for some applications, up to 15 encoder and/or decoder blocks may prove beneficial.

The width of convolution kernels 206 can also be varied. In some embodiments, narrow convolution kernels 206 paired with many blocks 210, 218 may perform better than wider convolution kernels 206. Networks configured in this manner can also be faster because the amount of work to compute a convolution kernel 206 operating over 3 input elements is less than half compared to convolution kernels 206 operating over 7 elements. The default width for convolution kernels 206 in the encoder is 3 and for the decoder it is 5, but, the invention is not limited to these widths.

Each convolution kernel 206 may be parameterized as $W \in \mathbb{R}^{2d \times 2d}$, $b_w \in \mathbb{R}^{2d}$ and may take as input $X \in \mathbb{R}^{k \times d}$ which is a concatenation of k input elements embedded in d dimensions. Each convolution kernel 206 may map the input to a single output element $Y \in \mathbb{R}^{2d}$ that has twice the dimensionality of the input elements. Subsequent blocks operate over the k output elements of the previous block; thus, the CNN is arranged hierarchically, with subsequent blocks forming a next level of the hierarchy as compared to a current block. Gated linear units (GLUs) 208 are used as a non-linearity which implement a simple gating mechanism over the output of the convolution $Y=[A\ B] \in \mathbb{R}^{2d}$:

$$v([A\ B]) = A \otimes \sigma(B) \tag{1}$$

where $A, B \in \mathbb{R}^d$ are the inputs to the non-linearity, $\otimes$ is the point-wise multiplication and the output $v([A\ B]) \in \mathbb{R}^d$ is half the size of Y. The gates $\sigma(B)$ control which inputs A of the current context are relevant (and thus are provided to the next level of the hierarchy). It is noted that gated linear units 208 were selected for a CNN that performs language translation tasks; however, other types of non-linearities may be beneficial for other types of sequence-to-sequence tasks.

To enable deep convolutional networks, residual connections 217 from the input 214 of each convolution to the output 212 of the block 210 are added (similar residual connections may be provided in the decoder network). Equation 2 represents the decoder output with a residual connection:

$$h_i^l = v\left(W^l\left[h_{i-\frac{k}{2}}^{l-1}, \ldots, h_{i+k/2}^{l-1}\right] + b_w^l\right) + h_i^{l-1} \tag{2}$$

For the encoder network, the output of the convolutional layers should match the input length. This is accomplished by padding the input at each layer. For the decoder network, no future information may be made available to the decoder (among other things, this allows for parallel processing in the decoder network, significantly improving processing efficiency). The decoder input is thus padded by k-1 elements on both the left and right sides. k elements are then removed from the end of the convolution output.

Linear mappings are added to project between the embedding size f and the hidden size 2d. A transform is applied to w when feeding it to the encoder network, to the encoder output $z_j^u$ 212, to the final layer of the decoder just before the softmax $h^L$, and to all decoder layers $h^l$ before computing attention scores as discussed below.

Finally, the model computes a distribution over the T possible next target words $y_{i+1}$ by transforming the top decoder output $h_i^L$ via a linear layer with weights $W_o$ and bias $b_o$:

$$p(y_{i+1}|y_1, \ldots, y_i, x) = \text{softmax}(W_o h_{i+1}^L + b_o) \in \mathbb{R}^T \tag{3}$$

Multi-Step Attention

In certain embodiments, there is a separate attention mechanism 216 for each decoder layer. The multiple attention mechanism computes a separate source context vector for each decoder layer. The computation also takes into account contexts computed for preceding decoder layers of the current time step as well as previous time steps that are within the receptive field of the decoder.

To compute the attention, the current decoder state $h_i^l$ 220 and an embedding $g_i$ 222 of the previous prediction $y_i$ are summarized as $d_i^l$ 224:

$$d_i^l = W_d^l h_i^l + b_d^l + g_i \tag{4}$$

For decoder layer l, the attention $a_{ij}^l$ of state i and source element j is computed as a dot-product between the decoder state summary $d_i^l$ 224 and each output $z_j^u$ 212 of the last encoder block u:

$$a_{ij}^l = \frac{\exp(d_i^l \cdot z_j^u)}{\sum_{t=1}^m \exp(d_i^l \cdot z_t^u)} \tag{5}$$

The conditional input $c_i^l$ 226 for the current decoder layer is a weighted sum of the encoder outputs as well as the raw input element embeddings 214:

$$c_i^l = \sum_{j=1}^m a_{ij}^l (z_j^u + e_j) \tag{6}$$

This differs from recurrent approaches which compute both the attention and the weighted sum over $z_j^u$ 212 only. Adding $e_j$ 204 is beneficial, as it resembles key-value memory networks where the keys are $z_j^u$ 212 and the values are $z_j^u + e_j$ 214. Encoder outputs $z_j^u$ 212 represent potentially large input contexts and embeddings $e_j$ 204 provide point information about a specific word that is useful when making a prediction.

Once $c_i^l$ 226 has been computed, it is simply added to the output 220 of the corresponding decoder layer $h_i^l$. This can be seen as attention with multiple 'hops,' as compared to single step attention. In particular, the attention of the first layer determines a useful source context which is then fed to the second layer, which takes this information into account when computing attention etc. The decoder has also immediate access to the attention history of the k−1 previous time steps because the conditional inputs $c_{i-k}^{l-1}, \ldots, c_i^{l-1}$ are part of $h_{i-k}^{l-1}, \ldots, h_i^{l-1}$ which are input to $h_i^l$. This makes it easy for the model to take into account which previous inputs have been attended to already, compared to recurrent nets where this information is in the recurrent state and needs to survive several non-linearities. Overall, the attention mechanism considers which word was previously attended to and also performs multiple attention 'hops' per time step.

The convolutional architecture of the embodiments described herein also allows the batching of the attention computation across all elements of a sequence, compared to recurrent neural networks. For multi-hop attention, the computations of each pass are batched individually.

Normalization Strategy

Batch-normalization stabilizes and accelerates learning by scaling activations to have zero mean and unit variance. Using the normalization strategy discussed below, all samples in a batch can be used for training. This stands in contrast to previous approaches, where some of the samples needed to be used to compute scaling statistics, and therefore could not be used for back-propagation.

In particular embodiments, the model weights are initialized and parts of the network are scaled to ensure that the variance throughout the network does not increase or decrease. The goal is to scale the output of residual blocks as well as the conditional input from the attention to preserve the variance of activations. The sum of the input and the output of a residual block are multiplied by $\sqrt{5.0}$, which halves the variance of the sum. This assumes that both summands have the same variance which is not always true but effective in practice.

The conditional input $c_i^l$ 214 is a weighted sum of m vectors, as shown in equation (6). A change in variance is counteracted through scaling by $m\sqrt{1/m}$. The inputs are scaled to the original size by multiplying by m, assuming the attention scores are uniformly distributed.

For convolutional decoders with multiple attention, the gradients are scaled for the encoder layers by the number of attention mechanisms used; source word embeddings may be excluded. This tends to stabilize learning, as otherwise the encoder received excessive gradient.

Initialization

Normalizing activations in the network when adding the output of different layers, e.g. residual connections, requires a careful weight initialization. For initialization, the goal is to maintain variances of activations throughout the forward and backward passes. All embeddings may be initialized from a normal distribution with mean 0 and standard deviation 0.1. For layers whose output is not subject to activation with gated linear units, the weights are initialized from $$\mathcal{N}\left(0, \sqrt{\frac{1}{n_l}}\right),$$

where $n_l$ is the number of input connections for each neuron. This ensures that the variance of a normally distributed input is retained.

For layers with an immediately succeeding gated linear unit (GLU) activation, if the GLU inputs are distributed with mean 0 and have sufficiently small variance, then the output variance can be approximated with ¼ of the input variance. The weights are thus initialized such that the input to the GLU activations have 4 times the variance of the layer input. This is achieved by drawing their initial values from $$\mathcal{N}\left(0, \sqrt{\frac{4}{n_l}}\right).$$

Biases are uniformly set to zero when the network is constructed.

Dropout is applied to the input of some layers so that inputs are retained with a probability of p. This can be seen as multiplication with a Bernoulli random variable taking value 1/p with probability p and 0 otherwise. The application of dropout will then cause the variance to be scaled by 1/p. The incoming variance can be restored by initializing the respective layers with larger weights. Specifically, $$\mathcal{N}\left(0, \sqrt{\frac{4p}{n_l}}\right).$$

are used for layers whose output is subject to GLU and $$\mathcal{N}\left(0, \sqrt{\frac{p}{n_l}}\right)$$

otherwise.

Parameters and Training

An example in which the model is parameterized and trained is next described. It is to be understood that this example is provided solely to illustrate the points described above; the present invention is by no means limited to the specific values given below.

In this example, both the encoders and the decoders were set up with 512 hidden units. In this case, all embeddings, including the output produced by the decoder before the final linear layer, have dimensionality 256. The same dimensionalities were used for linear layers mapping between the hidden and embedding sizes. Convolutional layers were initialized as described above.

The convolutional models were trained with Nesterov's accelerated gradient method using a momentum value of 0.99 and renormalized gradients if their norm exceeds 0.1. A learning rate of 0.25 was used, and once the validation perplexity stops improving, the learning rate was reduced by an order of magnitude each epoch until it falls below $10^{-4}$.

For all models, mini-batches of 64 sentences were used. The maximum number of words in a mini-batch was restricted to ensure that batches with long sentences still fit in GPU memory. If the threshold was exceeded, the batch is split in two and each half processed separately. Gradients were normalized by the number of non-padding tokens per mini-batch. Weight normalizations were used for all layers except for lookup tables.

In addition to applying dropout on the embeddings and the decoder output, dropout was applied to the input of the convolutional blocks. The network was trained on up to four processing units synchronously by maintaining copies on the model on each unit and splitting the batch so that each worker computed ¼$^{th}$ of the gradients; at the end, the gradients were summed. In this case, mini-batches consisted of 256 sequences in total.

An evaluation of this exemplary setup is described in the above-noted '354 application. In brief summary, the above-described convolutional model outperformed state-of-the art translation models by up to 1.6 points in Bilingual Evaluation Understudy (BLEU) score.

Figure 3:
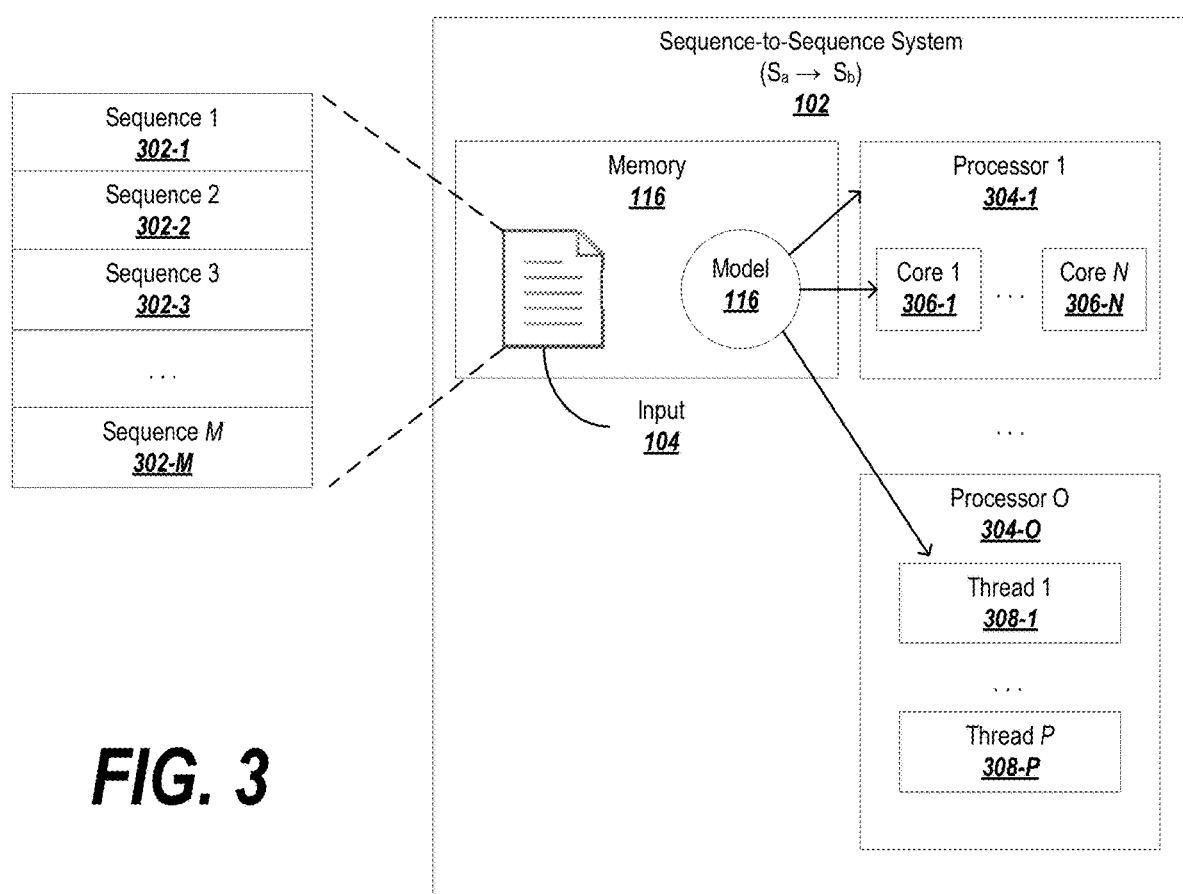
FIG. 3 depicts an example of a parallelized sequence-to-sequence system.

Next, various aspects of the overall sequence-to sequence system are described with respect to FIG. 3.

FIG. 3 depicts an example of a parallelized sequence-to-sequence system 102. The system 102 takes as input 104 a series of sequences 302-1 . . . 302-M. The series of sequences may be separate sequences, or maybe sub-sequences of a longer sequence. The memory 116 of system 102 holds inputs 104 as well as software implementing model 116, including convolutional neural network 118.

The software implementing model 116 is suitable to execute on any one of processors 304-1 . . . 304-O. In a multicore processor, for example, processor 304-1, various processing tasks related to the model 116 may execute on individual cores 306-1 . . . 306-N within the processor, and, as such, multiple sequences from the series of sequences 302-1 . . . 302-M may be processed in parallel, or parts of a single sequence can be processed in parallel, or various parts of the model 116 (e.g., different blocks) may be processed in parallel.

Likewise, in a processor not having multiple cores, for example, processor 304-O, multiple processing tasks related to the model 116 may be executed in separate threads 308-1 . . . 308-P, to process multiple processing tasks in parallel.

Additionally, convolutional neural networks do not depend on the computations of the previous time step, and therefore allow parallelization over every element in the input sequence 202. During training, computation in the encoder 210 and decoder 218 of convolutional neural network 118 within model 116, and the attention portion 216 of model 116 may be parallelized over the target sequence utilizing separate cores 306-1 . . . 306-M as shown in processor 304-1, or in separate threads 308-1 . . . 308-P as shown in processor 304-O.

Figures 4A, 4B:
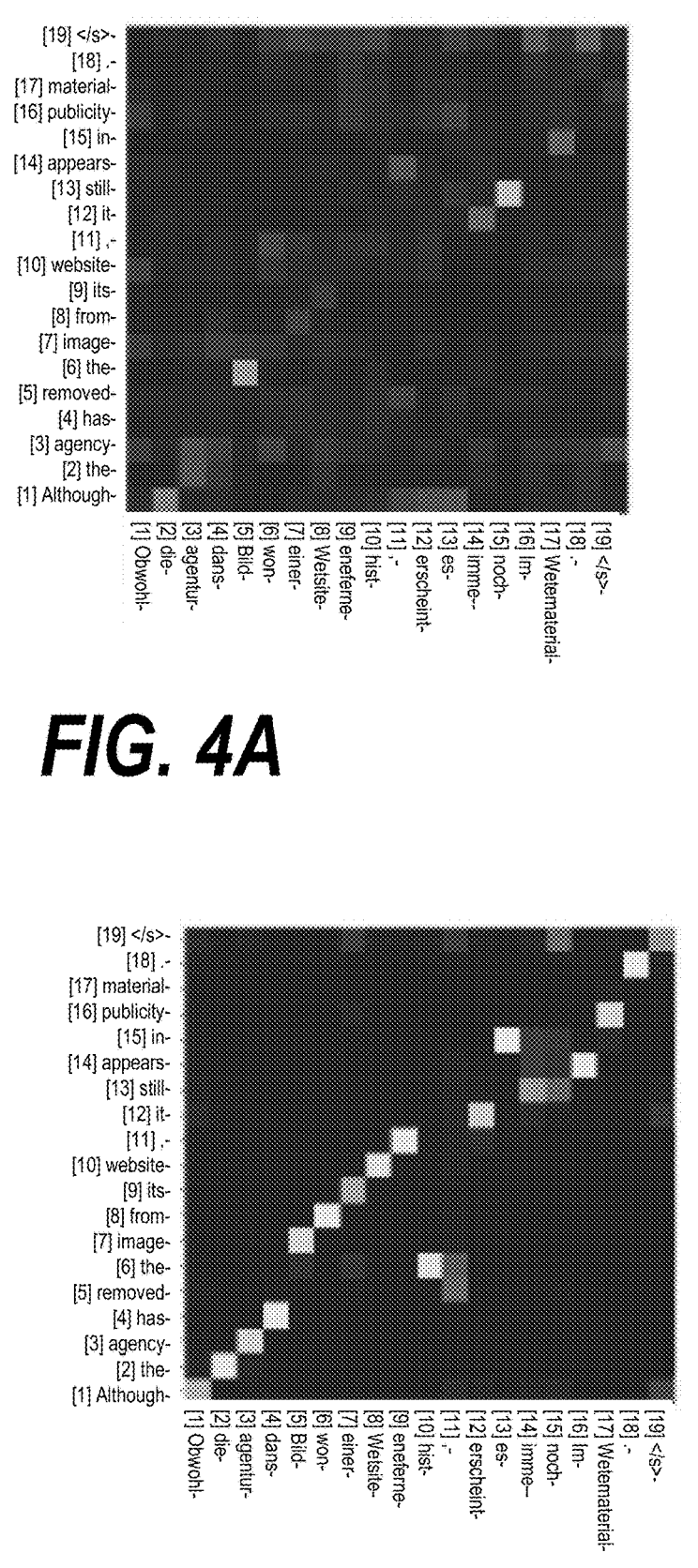
Figures 4C, 4D:
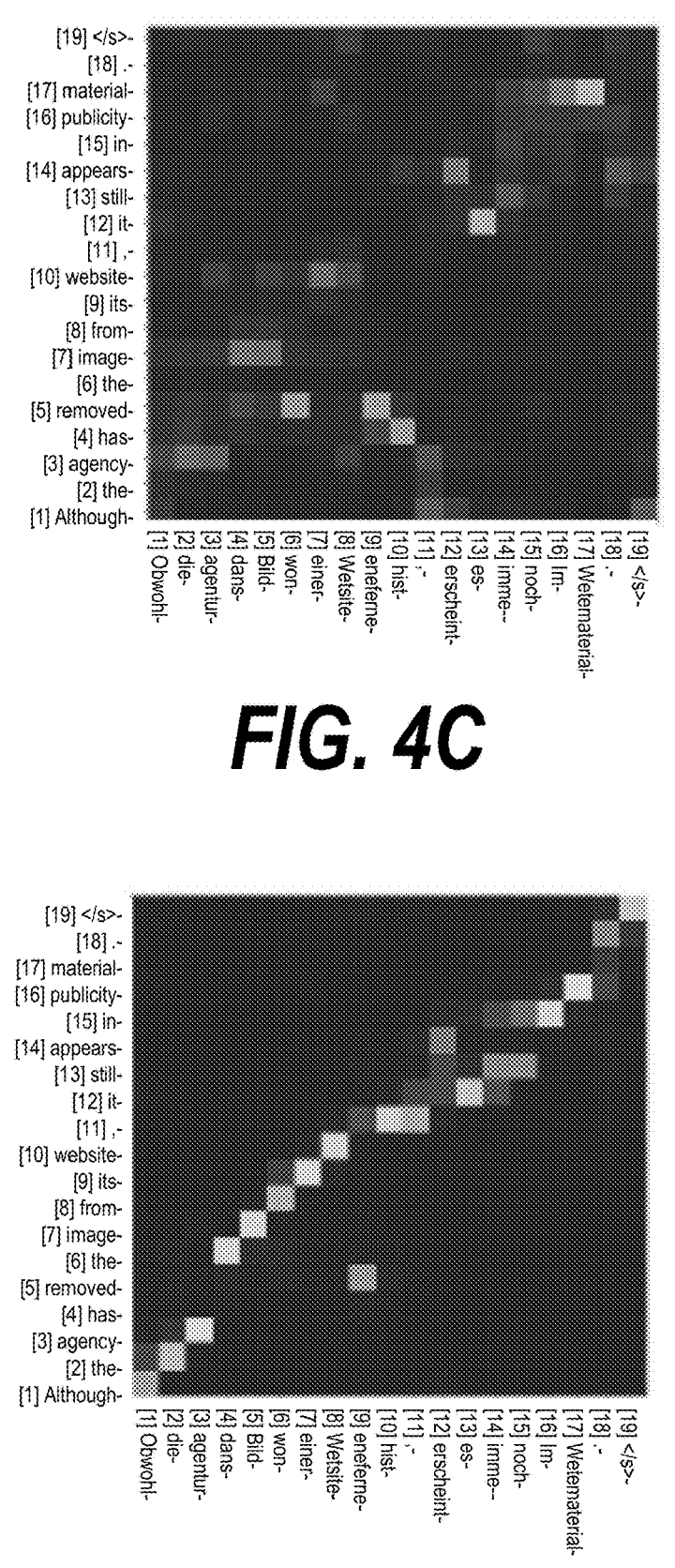
Figure 4E:
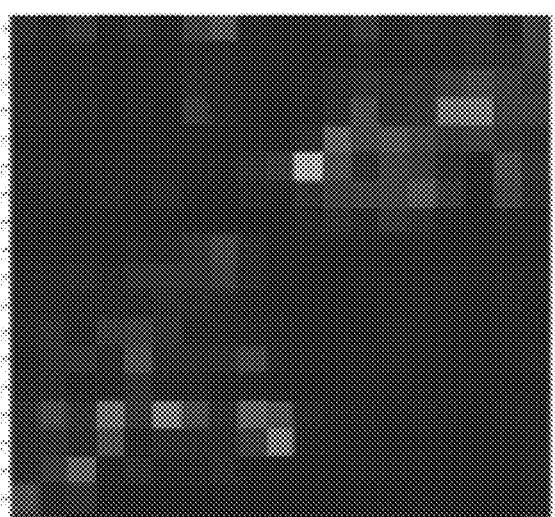

With regards to the attention mechanism 216, FIG. 4 shows one example of this mechanism in more detail. More specifically, FIG. 4 shows examples of heatmaps representing attention scores of various layers of a convolutional neural network based decoder. The attention scores are applied to determine which element of input sequence 202 is most relevant to be operated on next. FIG. 4A-4E show attention scores for decoder layers 1-5, respectively, for the translation of an English sentence to its German equivalent. As can be seen, as shown by the lighter areas of the heatmaps, some layers produce very sharp attention scores, whereas others are more uniform. The lighter areas represent higher attention scores, and indicate which elements of the input sequence 202 are more likely to be processed in the next round. In some embodiments, this may be achieved by summing the attention scores for a given element across multiple decoder blocks, and selecting the element with the highest cumulative score.

Exemplary Logic

Figure 5:
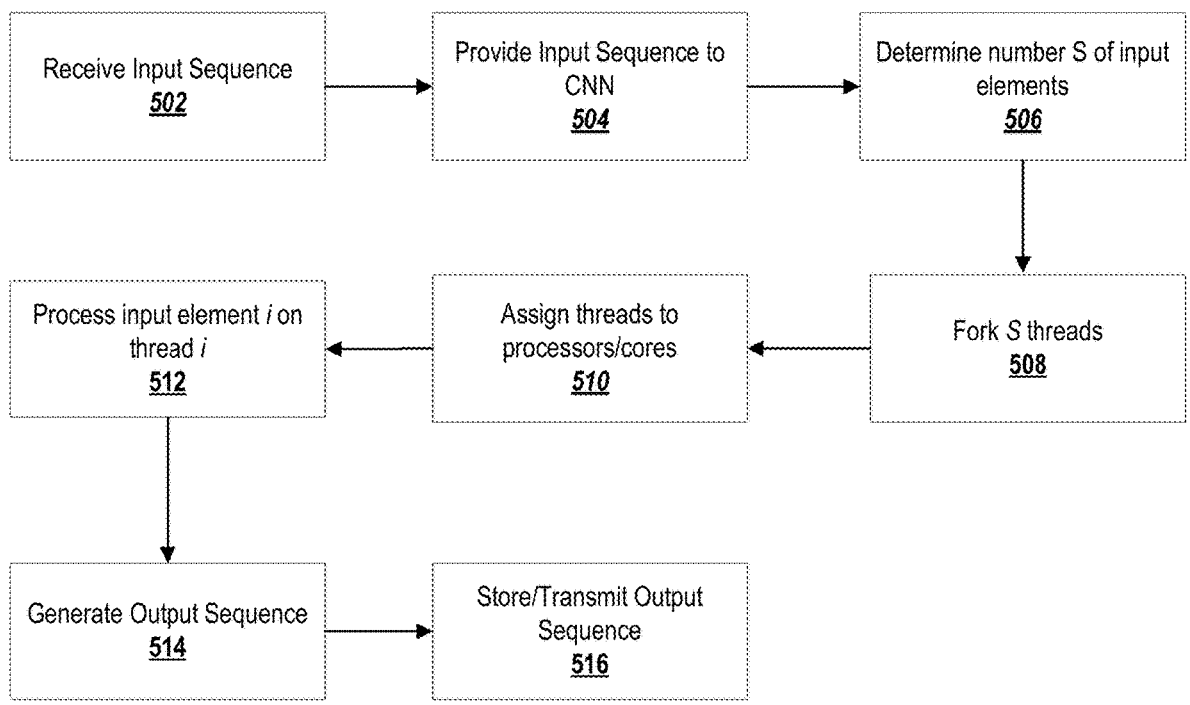
FIG. 5 is a flow chart depicting exemplary logic for performing a method according to exemplary embodiments.

FIG. 5 is a flow chart depicting exemplary sequence-to-sequence logic 500 for performing a method according to exemplary embodiments.

At 502, input $S_a$ 104 to sequence-to-sequence system 102, as shown in FIG. 1, is received, and utilized as input sequence 202, as described in more detail above with respect to FIG. 2.

At 504, the input sequence 202 is provided to convolutional neural network, which includes a plurality of blocks in the encoder and/or decoder. As described above, the encoder and decoder may have different numbers of layers.

Because one advantage of utilizing the convolutional neural network is the ability to do parallel processing, the number S of input elements (e.g., a length of the input sequence, or a number of element representations used to represent the input sequence) may be determined at 506.

At 508, a plurality of S threads are forked, corresponding to the value S determined at block 506. At 510, the threads are assigned to a processor, or a core of a processor, as shown in FIG. 3.

At 512, each of the S forked threads operates on a respective input element from the input sequence. The structure described above allows the decoder network to work on the entire input sequence at once, with no temporal dependency. By batch processing the attention computation across all elements of an input sequence, the calculations are parallelized, thereby significantly speeding up computation and training of the RNN.

At 514, the output sequence, as described in FIG. 2, is generated, and, at 516 the output sequence is stored and/or transmitted as output $S_b$ 110 of sequence-to-sequence system 102, as shown in FIG. 1.

Network Embodiments

Figure 6:
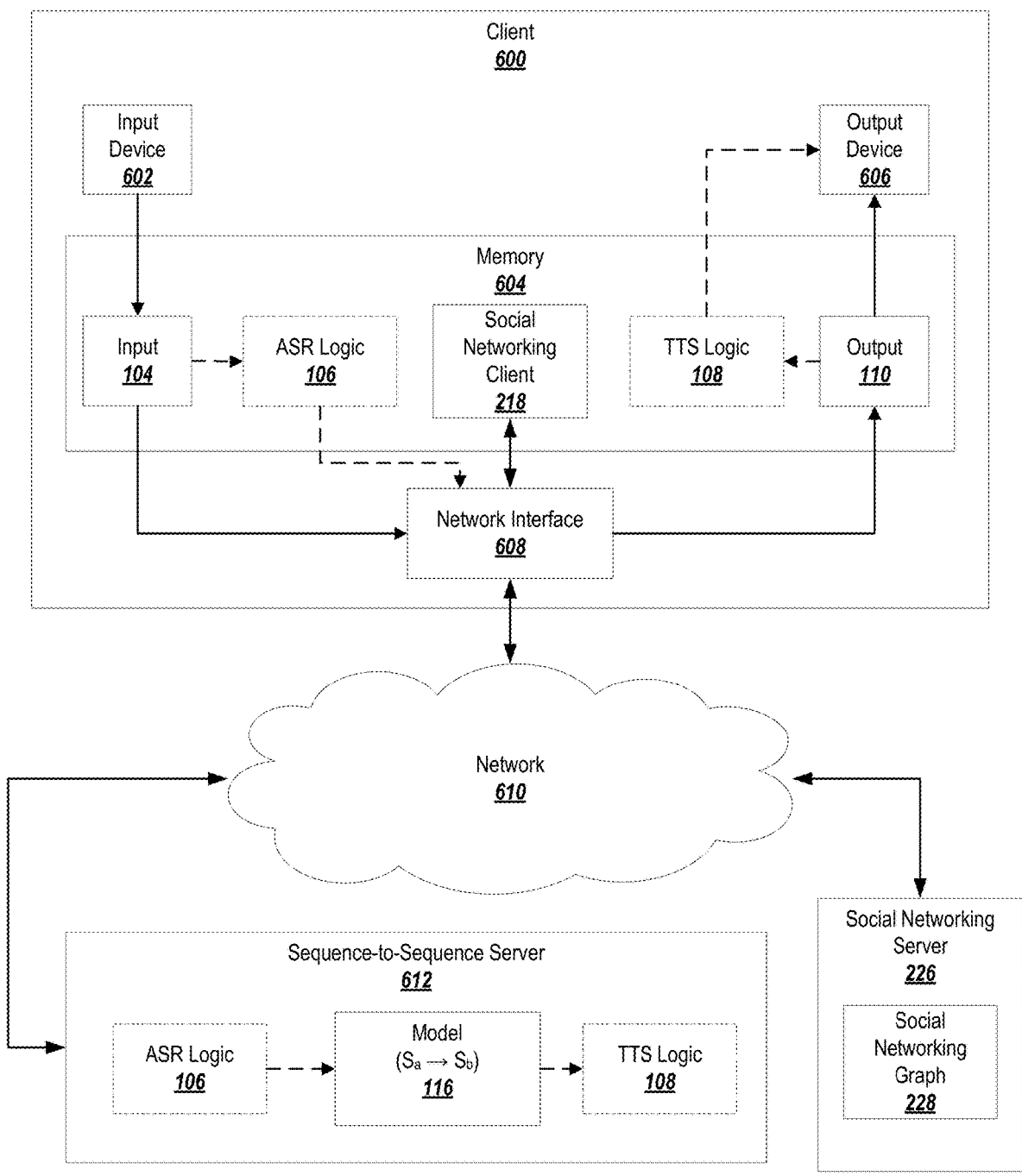
FIG. 6 depicts an exemplary network embodiment.

Some exemplary embodiments may be employed in a network environment, such as the environment depicted in FIG. 6.

A user may interact with a client 600, which may be (for example) a personal computer, tablet, mobile phone, special-purpose translation device, etc. In some embodiments, the client 600 does not require interaction from a user.

The client 600 may include one or more input devices 602 and one or more output devices 606. The input devices 602 may include, for example, microphones, keyboards, cameras, electronic pens, touch screens, and other devices for receiving an input sequence. The output devices 606 may include a speaker, a display device such as a monitor or touch screen, and other devices for presenting an output sequence.

In some embodiments, the input from the input devices 602 may be in the form of an input 104 that is being sent to a sequence-to-sequence system 102 for translation from an input sequence to an output sequence. In other embodiments, the client 600 may also submit training data 112, a translation, or a translation and the original source data used to generate the translation.

The client 600 may include a memory 604, which may be a non-transitory computer readable storage medium, such as one or a combination of a hard drive, solid state drive, flash storage, read only memory, or random access memory. The memory 604 may be a representation of an input 104 and/or a representation of an output 110, as well as one or more applications. For example, the memory 604 may store a social networking client 218 that allows a user to interact with a social networking service.

The input 104 may be textual, such as in the case where the input device 602 is a keyboard. Alternatively, the input 104 may be an audio recording, such as in the case where the input device 602 is a microphone. Accordingly, the input 104 may be subjected to automatic speech recognition (ASR) logic 106 to transform the audio recording to text that is processable by the sequence-to-sequence servers 612. As shown in FIG. 6, the ASR logic 106 may be located at the client device 600 (so that the audio recording is processed locally by the client 600 and corresponding text is transmitted to the sequence-to-sequence server 612), or may be located remotely at the sequence-to-sequence server 612 (in which case, the audio recording may be transmitted to the sequence-to-sequence server 612 and the sequence-to-sequence server 612 may process the audio into text). Other combinations are also possible—for example, if the input device 602 is a touch pad or electronic pen, the input 104 may be in the form of handwriting, which may be subjected to handwriting or optical character recognition analysis logic in order to transform the input 104 into processable text.

Similarly, a resulting output 110 from a sequence-to-sequence servers 612 may be in the form of text. In some embodiments, the desirable end form of the output may be something other than text, such as an audio representation of the translation. Accordingly, the output 110 may be subjected to text-to-speech (TTS) logic 108 to transform the text into an audio recording that is presentable by the output device 606. As shown in FIG. 6, the TTS logic 108 may be located at the client 600 (so that the output text is processed locally by the client 600 and corresponding audio is sent to the output device 606), or may be located remotely at the sequence-to-sequence server 612 (in which case, text may be processed at the sequence-to-sequence server 612 and the resulting audio recording may be transmitted to the client 600). Other combinations of processing logic are also possible, depending on the desired final form for the output 110.

The client 600 may be provided with a network interface 608 for communicating with a network 610, such as the Internet. The network interface 608 may transmit the input 104 in a format and/or using a protocol compatible with the network 610 and may receive a corresponding output 110 from the network 610.

The network interface 608 may communicate through the network 610 sequence-to-sequence server 612. The sequence-to-sequence server 612 may host model 116 for translating an input sequence to an output sequence. The model 116 may translate the input 104 into an Output 110.

The network interface 608 of the client 600 may also be used to communicate through the network 610 with a social networking server 626. The social networking server 626 may include or may interact with a social networking graph 700 that defines connections in a social network. Furthermore, the sequence-to-sequence server 612 may connect to the social networking server 626 for various purposes, such as retrieving training data from the social network.

A user of the client 600 may be an individual (human user), an entity (e.g., an enterprise, business, or third-party application), or a group (e.g., of individuals or entities) that interacts or communicates with or over the social-networking server 626. The social-networking server 626 may be a network-addressable computing system hosting an online social network. The social-networking server 626 may generate, store, receive, and send social-networking data, such as, for example, user-profile data, concept-profile data, social-graph information, or other suitable data related to the online social network. The social-networking server 626 may be accessed by the other components of the network environment either directly or via the network 610.

The social-networking server 626 may include an authorization server (or other suitable component(s)) that allows users to opt in to or opt out of having their actions logged by social-networking server 626 or shared with other systems (e.g., third-party systems, such as the sequence-to-sequence server 612), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 626 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example, and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social-networking server 626 or shared with other systems (e.g., a third-party system). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of a third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking system 626 may send a request to the data store for the object. The request may identify the user associated with the request. The requested data object may only be sent to the user (or a client system 600 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network that may benefit from the above-described translation system. Targeting criteria used to identify and target users may include explicit, stated user interests on social-networking server 626 or explicit connections of a user to a node, object, entity, brand, or page on social-networking server 626. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

Figure 7:
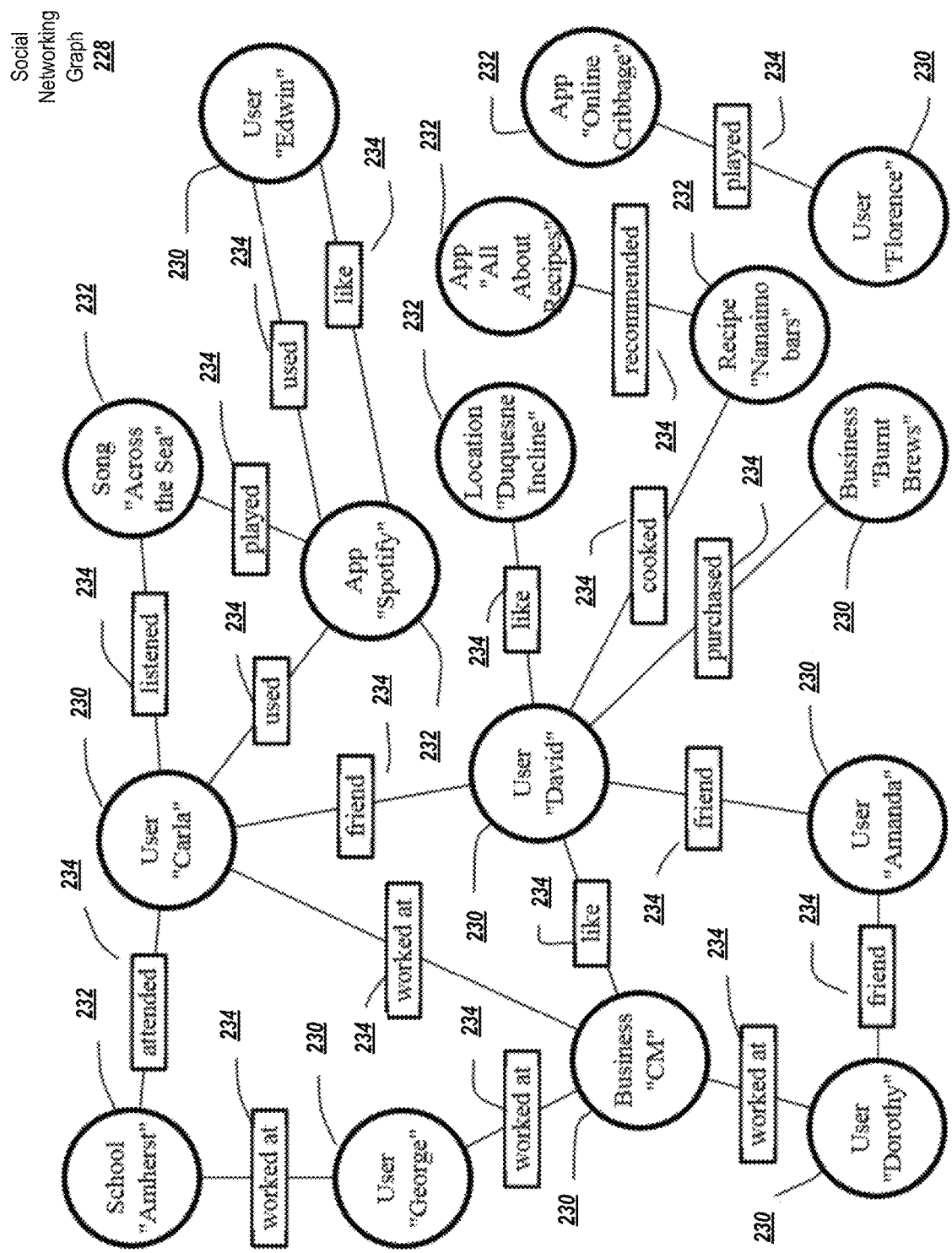
FIG. 7 describes the social networking graph depicted in FIG. 6 in more detail.

FIG. 7 illustrates an example of a social graph 700. In exemplary embodiments, a social-networking service may store one or more social graphs 700 in one or more data stores as a social graph data structure via the social networking service.

The social graph 700 may include multiple nodes, such as user nodes 730 and concept nodes 732. The social graph 700 may furthermore include edges 734 connecting the nodes. The nodes and edges of social graph 700 may be stored as data objects, for example, in a data store (such as a social-graph database). Such a data store may include one or more searchable or queryable indexes of nodes or edges of social graph 700.

The social graph 700 may be accessed by a social-networking server 726, client system 710, third-party system (e.g., the translation server 724), or any other approved system or device for suitable applications.

A user node 730 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 730 corresponding to the user, and store the user node 730 in one or more data stores. Users and user nodes 730 described herein may, where appropriate, refer to registered users and user nodes 730 associated with registered users. In addition, or as an alternative, users and user nodes 730 described herein may, where appropriate, refer to users that have not registered with the social-networking system. In particular embodiments, a user node 730 may be associated with information provided by a user or information gathered by various systems, including the social-networking system. As an example, and not by way of limitation, a user may provide their name, profile picture, contact information, birth date, sex, marital status, family status, employment, education background, preferences, interests, or other demographic information. In particular embodiments, a user node 730 may be associated with one or more data objects corresponding to information associated with a user. In particular embodiments, a user node 730 may correspond to one or more webpages. A user node 730 may be associated with a unique user identifier for the user in the social-networking system.

In particular embodiments, a concept node 732 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 732 may be associated with information of a concept provided by a user or information gathered by various systems, including the social-networking system. As an example, and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 732 may be associated with one or more data objects corresponding to information associated with concept node 732. In particular embodiments, a concept node 732 may correspond to one or more webpages.

In particular embodiments, a node in social graph 700 may represent or be represented by a webpage (which may be referred to as a "profile page"). Profile pages may be hosted by or accessible to the social-networking system. Profile pages may also be hosted on third-party websites associated with a third-party server. As an example, and not by way of limitation, a profile page corresponding to a particular external webpage may be the particular external webpage and the profile page may correspond to a particular concept node 732. Profile pages may be viewable by all or a selected subset of other users. As an example, and not by way of limitation, a user node 730 may have a corresponding user-profile page in which the corresponding user may add content, make declarations, or otherwise express himself or herself. A business page may comprise a user-profile page for a commerce entity. As another example and not by way of limitation, a concept node 732 may have a corresponding concept-profile page in which one or more users may add content, make declarations, or express themselves, particularly in relation to the concept corresponding to concept node 732.

In particular embodiments, a concept node 732 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 730 corresponding to the user and a concept node 732 corresponding to the third-party webpage or resource and store edge 734 in one or more data stores.

In particular embodiments, a pair of nodes in social graph 700 may be connected to each other by one or more edges 734. An edge 734 connecting a pair of nodes may represent a relationship between the pair of nodes. In particular embodiments, an edge 734 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 734 connecting the first user's user node 730 to the second user's user node 730 in social graph 700 and store edge 734 as social-graph information in one or more data stores. In the example of FIG. 7, social graph 700 includes an edge 734 indicating a friend relation between user nodes 730 of user "Amanda" and user "Dorothy." Although this disclosure describes or illustrates particular edges 734 with particular attributes connecting particular user nodes 730, this disclosure contemplates any suitable edges 734 with any suitable attributes connecting user nodes 730. As an example, and not by way of limitation, an edge 734 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 734.

In particular embodiments, an edge 734 between a user node 730 and a concept node 732 may represent a particular action or activity performed by a user associated with user node 730 toward a concept associated with a concept node 732. As an example, and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 732 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTTY, which is an online music application). In this case, the social-networking system may create a "listened" edge 734 and a "used" edge (as illustrated in FIG. 7) between user nodes 730 corresponding to the user and concept nodes 732 corresponding to the song and application to indicate that the user listened to the song and used the application. Moreover, the social-networking system may create a "played" edge 734 (as illustrated in FIG. 7) between concept nodes 732 corresponding to the song and the application to indicate that the particular song was played by the particular application. In this case, "played" edge 734 corresponds to an action performed by an external application (SPOTIFY) on an external audio file (the song "Across the Sea"). Although this disclosure describes particular edges 734 with particular attributes connecting user nodes 730 and concept nodes 732, this disclosure contemplates any suitable edges 734 with any suitable attributes connecting user nodes 730 and concept nodes 732. Moreover, although this disclosure describes edges between a user node 730 and a concept node 732 representing a single relationship, this disclosure contemplates edges between a user node 730 and a concept node 732 representing one or more relationships. As an example, and not by way of limitation, an edge 734 may represent both that a user likes and has used at a particular concept. Alternatively, another edge 734 may represent each type of relationship (or multiples of a single relationship) between a user node 730 and a concept node 732 (as illustrated in FIG. 7 between user node 730 for user "Edwin" and concept node 732 for "SPOTIFY").

In particular embodiments, the social-networking system may create an edge 734 between a user node 730 and a concept node 732 in social graph 700. As an example, and not by way of limitation, a user viewing a concept-profile page (such as, for example, by using a web browser or a special-purpose application hosted by the user's client system) may indicate that he or she likes the concept represented by the concept node 732 by clicking or selecting a "Like" icon, which may cause the user's client system to send to the social-networking system a message indicating the user's liking of the concept associated with the concept-profile page. In response to the message, the social-networking system may create an edge 734 between user node 730 associated with the user and concept node 732, as illustrated by "like" edge 734 between the user and concept node 732. In particular embodiments, the social-networking system may store an edge 734 in one or more data stores. In particular embodiments, an edge 734 may be automatically formed by the social-networking system in response to a particular user action. As an example, and not by way of limitation, if a first user uploads a picture, watches a movie, or listens to a song, an edge 734 may be formed between user node 730 corresponding to the first user and concept nodes 732 corresponding to those concepts. Although this disclosure describes forming particular edges 734 in particular manners, this disclosure contemplates forming any suitable edges 734 in any suitable manner.

The social graph 700 may further comprise a plurality of product nodes. Product nodes may represent particular products that may be associated with a particular business. A business may provide a product catalog to a consumer-to-business service and the consumer-to-business service may therefore represent each of the products within the product in the social graph 700 with each product being in a distinct product node. A product node may comprise information relating to the product, such as pricing information, descriptive information, manufacturer information, availability information, and other relevant information. For example, each of the items on a menu for a restaurant may be represented within the social graph 700 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 700. The information for a product node may be manipulated by the social-networking system as a product object that encapsulates information regarding the referenced product.

As such, the social graph 700 may be used to infer shared interests, shared experiences, or other shared or common attributes of two or more users of a social-networking system. For instance, two or more users each having an edge to a common business, product, media item, institution, or other entity represented in the social graph 700 may indicate a shared relationship with that entity, which may be used to suggest customization of a use of a social-networking system, including a messaging system, for one or more users.

Computer-Related Embodiments

Figure 8:
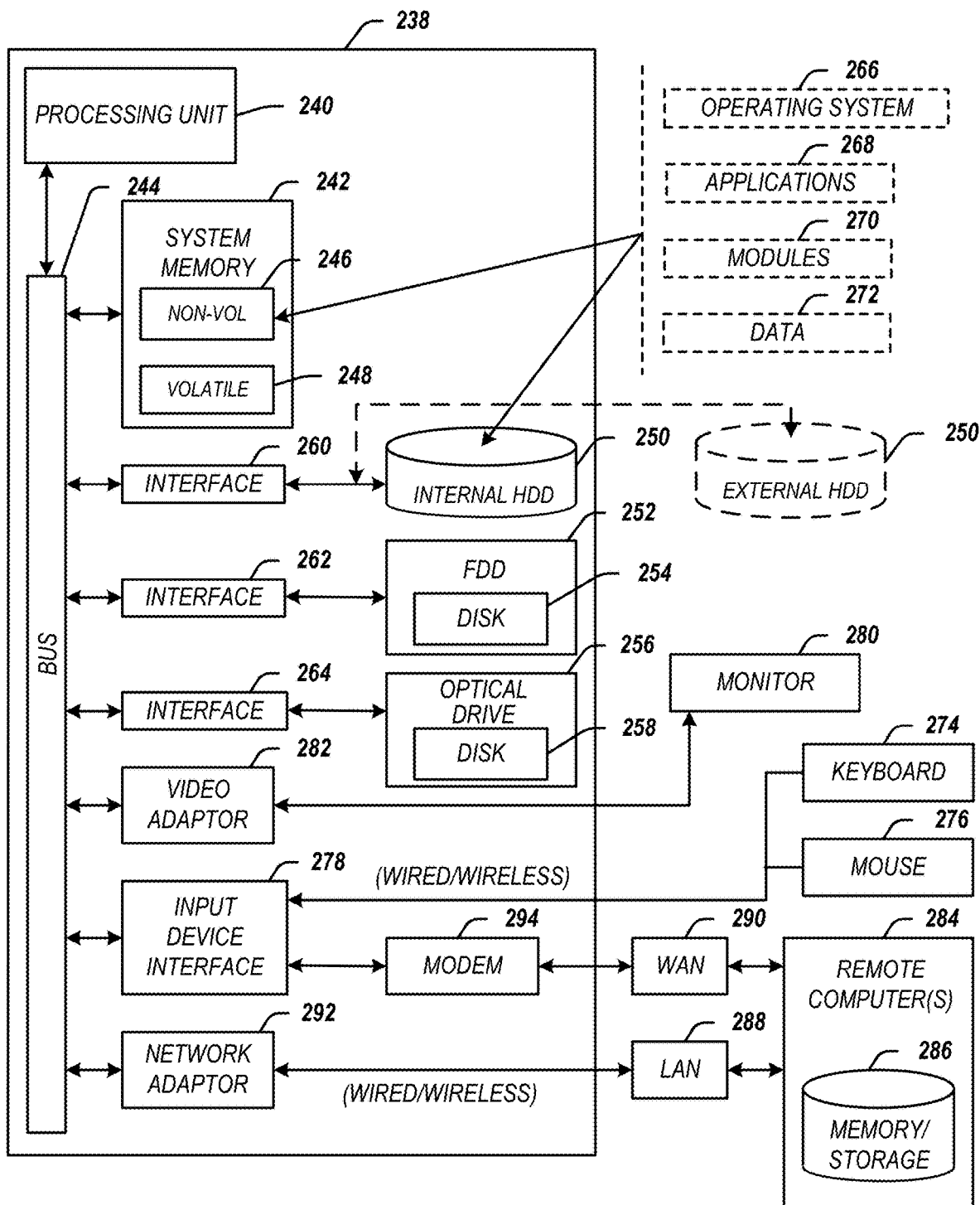
FIG. 8 depicts an exemplary computing device suitable for use with exemplary embodiments.

The above-described methods may be embodied as instructions on a computer readable medium or as part of a computing architecture. FIG. 8 illustrates an embodiment of an exemplary computing architecture 836 suitable for implementing various embodiments as previously described. In one embodiment, the computing architecture 836 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 836. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 836 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 836.

As shown in FIG. 8, the computing architecture 836 comprises a processing unit 840, a system memory 842 and a system bus 844. The processing unit 840 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 840.

The system bus 844 provides an interface for system components including, but not limited to, the system memory 842 to the processing unit 840. The system bus 844 can be any of several types of bus structure that may further interconnect to a memory bus (with or without a memory controller), a peripheral bus, and a local bus using any of a variety of commercially available bus architectures. Interface adapters may connect to the system bus 844 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 836 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 842 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 842 can include non-volatile memory 846 and/or volatile memory 848. A basic input/output system (BIOS) can be stored in the non-volatile memory 846.

The computer 838 may include various types of computer-readable storage media in the form of one or more lower speed memory units, including an internal (or external) hard disk drive (HDD) 850, a magnetic floppy disk drive (FDD) 852 to read from or write to a removable magnetic disk 854, and an optical disk drive 856 to read from or write to a removable optical disk 858 (e.g., a CD-ROM or DVD). The HDD 850, FDD 852 and optical disk drive 856 can be connected to the system bus 844 by a HDD interface 860, an FDD interface 862 and an optical drive interface 864, respectively. The HDD interface 860 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 846, 848, including an operating system 866, one or more application programs 868, other program modules 870, and program data 872. In one embodiment, the one or more application programs 868, other program modules 870, and program data 872 can include, for example, the various applications and/or components of the system.

A user can enter commands and information into the computer 838 through one or more wire/wireless input devices, for example, a keyboard 874 and a pointing device, such as a mouse 876. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 840 through an input device interface 878 that is coupled to the system bus 844, but can be connected by other interfaces such as a parallel port, IEEE 694 serial port, a game port, a USB port, an IR interface, and so forth.

A monitor 880 or other type of display device is also connected to the system bus 844 via an interface, such as a video adaptor 882. The monitor 880 may be internal or external to the computer 838. In addition to the monitor 880, a computer typically includes other peripheral output devices, such as speakers, printers, and so forth.

The computer 838 may operate in a networked environment using logical connections via wire and/or wireless communications to one or more remote computers, such as a remote computer 884. The remote computer 884 can be a workstation, a server computer, a router, a personal computer, portable computer, microprocessor-based entertainment appliance, a peer device or other common network node, and typically includes many or all of the elements described relative to the computer 838, although, for purposes of brevity, only a memory/storage device 886 is illustrated. The logical connections depicted include wire/wireless connectivity to a local area network (LAN) 888 and/or larger networks, for example, a wide area network (WAN) 890. Such LAN and WAN networking environments are commonplace in offices and companies, and facilitate enterprise-wide computer networks, such as intranets, all of which may connect to a global communications network, for example, the Internet.

When used in a LAN networking environment, the computer 838 is connected to the LAN 888 through a wire and/or wireless communication network interface or adaptor 892. The adaptor 892 can facilitate wire and/or wireless communications to the LAN 888, which may also include a wireless access point disposed thereon for communicating with the wireless functionality of the adaptor 892.

When used in a WAN networking environment, the computer 838 can include a modem 894, or is connected to a communications server on the WAN 890, or has other means for establishing communications over the WAN 890, such as by way of the Internet. The modem 894, which can be internal or external and a wire and/or wireless device, connects to the system bus 844 via the input device interface 878. In a networked environment, program modules depicted relative to the computer 838, or portions thereof, can be stored in the remote memory/storage device 886. It will be appreciated that the network connections shown are exemplary and other means of establishing a communications link between the computers can be used.

The computer 838 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
receiving an input sequence of data;
providing the input sequence to a convolutional neural network comprising:
an entirely convolutional encoder configured to encode the input sequence; and
an entirely convolutional decoder comprising a plurality of layers, each layer associated with a respective attention that applies multiple attention passes in each of a plurality of time steps as part of a determination of a next part of the input sequence to which the decoder attends, wherein each attention pass comprises computing a conditional input for the respective decoder layer, and adding the conditional input to an output of the respective decoder layer; and
applying the convolutional neural network to generate an output sequence representing a translation of the input sequence of data from a first language into a second language.

2. The method of claim 1, wherein the convolutional neural network is arranged hierarchically, and at least one of the encoder or the decoder applies one or more non-linearities to determine which elements of a given hierarchical level are passed through to a next hierarchical level.

3. The method of claim 1, wherein computations in the decoder are parallelized.

4. The method of claim 1, wherein at least one of the encoder or the decoder is made up of a plurality of blocks, each of the plurality of blocks comprising at least one convolution and at least one non-linearity.

5. The method of claim 4, further comprising a residual connection that adds the input of a respective block to the output of the respective block.

6. The method of claim 1, wherein: the respective attention computes a context vector for its respective decoder layer, and the convolutional neural network accounts for contexts computed for preceding layers of the decoder at a given time step and at previous time steps that are within a receptive field of the respective decoder network layer.

7. A non-transitory computer-readable medium storing instructions that, when executed by one or more processors, cause the one or more processors to:
receive an input sequence of data;
provide the input sequence to a convolutional neural network comprising:
an entirely convolutional encoder configured to encode the input sequence; and
an entirely convolutional decoder comprising a plurality of layers, each layer associated with a respective attention that applies multiple attention passes in each of a plurality of time steps as part of a determination of a next part of the input sequence to which the decoder attends, wherein each attention pass comprises computing a conditional input for the respective decoder layer, and adding the conditional input to an output of the respective decoder layer; and apply the convolutional neural network to generate an output sequence representing a translation of the input sequence of data from a first language into a second language.

8. The medium of claim 7, wherein the convolutional neural network is arranged hierarchically, and at least one of the encoder or the decoder applies one or more nonlinearities to determine which elements of a given hierarchical level are passed through to a next hierarchical level.

9. The medium of claim 7, wherein computations in the decoder are parallelized.

10. The medium of claim 7, wherein at least one of the encoder or the decoder is made up of a plurality of blocks, each of the plurality of blocks comprising at least one convolution and at least non-linearity.

11. The medium of claim 10, further comprising a residual connection that adds the input of a respective block to the output of the respective block.

12. The medium of claim 7, wherein: the respective attention computes a context vector for its respective decoder network layer, and the convolutional neural network accounts for contexts computed for preceding layers of the decoder at a given time step and at previous time steps that are within a receptive field of the respective decoder layer.

13. An apparatus comprising:
a non-transitory computer-readable medium configured to store an input sequence of data; and
a hardware processor circuit configured to provide the input sequence to a convolutional neural network comprising:
an entirely convolutional encoder configured to encode the input sequence; and
an entirely convolutional decoder comprising a plurality of layers, each layer associated with a respective attention that applies multiple attention passes in each of a plurality of time steps as part of a determination of a next part of the input sequence to which the decoder attends, wherein each attention pass comprises computing a conditional input for the respective decoder layer, and adding the conditional input to an output of the respective decoder layer, wherein the hardware processor circuit is configured to apply the convolutional neural network to generate an output sequence representing a translation of the input sequence of data from a first language into a second language.

14. The apparatus of claim 13, wherein the convolutional neural network is arranged hierarchically, and at least one of the encoder or the decoder applies one or more nonlinearities to determine which elements of a given hierarchical level are passed through to a next hierarchical level.

15. The apparatus of claim 13, wherein computations in the decoder are parallelized.

16. The apparatus of claim 13, wherein at least one of the encoder or the decoder is made up of a plurality of blocks, each of the plurality of blocks comprising at least one convolution and at least non-linearity.

17. The apparatus of claim 16, further comprising a residual connection that adds the input of a respective block to the output of the respective block.

18. The method of claim 1, wherein the conditional input is computed as a weighted sum of outputs of the encoder and an embedding of the input sequence of data.

19. The medium of claim 7, wherein the conditional input is computed as a weighted sum of outputs of the encoder and an embedding of the input sequence of data.

20. The apparatus of claim 13, wherein the conditional input is computed as a weighted sum of outputs of the encoder and an embedding of the input sequence of data.

* * * * *